UNITED STATES PATENT OFFICE.

JOHN A. SCHAEFER, OF NEW YORK, N. Y., ASSIGNOR TO JOHN A. SCHAEFER, JR., WILLIAM NORMAN, AND ROBERT W. DAVIES, OF SAME PLACE.

IMPROVEMENT IN PROCESSES OF EXTRACTING MALT IN THE MANUFACTURE OF BEER.

Specification forming part of Letters Patent No. 220,872, dated October 21, 1879; application filed July 22, 1879.

*To all whom it may concern:*

Be it known that I, JOHN A. SCHAEFER, of New York, in the county of New York, and in the State of New York, have invented certain new and useful Improvements in Process for Extracting Malt in the Manufacture of Beer, &c.; and I do hereby declare that the following is a full, clear, and exact description thereof.

The malt is to be coarsely ground and bolted. The husk or bran is separated from the ground malt, and the ground malt placed in the mashing-tub. Cut straw, or its equivalent, is to be mixed with the malt before mashing, and then mash in the usual way.

Straw or other suitable filtering material is placed under the perforated false bottom of the mash-tub in which the liquid is mashed or separated from the malt, and then proceed in the usual way of exhausting the malt by means of hot water. When the hot water is first introduced into the mash-tub the temperature of the water should be about 28° Reaumur or 95° Fahrenheit. After the first introduction of the water, however, it may be as hot as desired.

Heretofore, when attempts have been made to use ground malt in connection with straw as a filter and cut straw as an ingredient, the ground malt formed a paste on the bottom of the mash-tub and the liquid would not run off from the same; but by using the water, when it is first introduced, at a lower temperature, substantially as stated, no such paste will be formed, the running off of the liquid is secured, and the process rendered a success, thereby manufacturing a much finer article of beer, ale, and other malt liquors, and preventing the same from souring, and at the same making a considerable saving in the amount of malt consumed in the manufacture.

Having thus fully described my invention, what I claim as new, and desire to secure by Letters Patent, is—

In the process of obtaining wort from ground and bolted malt-meal for manufacturing malt liquors where straw is used as a filter in the mash-tub, and cut straw as an ingredient in the mash, the process of preventing the conversion of the malt-meal into paste or dough, and the consequent clogging of the filtering-straw, which consists in introducing the first water at a comparatively low temperature—say, 95° Fahrenheit—into the mash, and then raising the temperature of the water to the boiling-point, substantially as and for the purposes herein set forth.

In testimony that I claim the foregoing I have hereunto set my hand and seal this 18th day of July, 1879.

JOHN A. SCHAEFER.

Witnesses:
ROBT. W. DAVIES,
BENJN. PAGE.